United States Patent [19]

Kliman et al.

[11] Patent Number: 5,705,869
[45] Date of Patent: Jan. 6, 1998

[54] MAGNETIC AXIAL THRUST BEARINGS FABRICATED ON INDIVIDUAL STATOR SEGMENTS

[75] Inventors: Gerald Burt Kliman, Schenectady; Mark Alan Preston, Niskayuna, both of N.Y.

[73] Assignee: General Electric Company, Schenectady, N.Y.

[21] Appl. No.: 493,022

[22] Filed: Jun. 21, 1995

[51] Int. Cl.$^6$ ........................................ F16C 39/06
[52] U.S. Cl. ........................................ 310/90.5; 310/82
[58] Field of Search ........................ 310/90.5, 82, 157, 310/254, 268

[56] References Cited

U.S. PATENT DOCUMENTS

| | | | |
|---|---|---|---|
| 3,474,272 | 10/1969 | Newell | 310/254 X |
| 3,579,276 | 5/1971 | Newell | 310/82 |
| 3,644,764 | 2/1972 | Newel | 310/82 |
| 4,353,602 | 10/1982 | Habermann | 310/90.5 |
| 4,726,640 | 2/1988 | Iwama et al. | 310/90.5 X |
| 4,920,291 | 4/1990 | McSparran | 310/90.5 |
| 5,350,283 | 9/1994 | Nakazeki et al. | 310/90.5 X |

*Primary Examiner*—Mark O. Budd
*Attorney, Agent, or Firm*—Ann M. Agosti; Marvin Snyder

[57] ABSTRACT

An axial magnetic thrust bearing stator includes a plurality of laminated cores. Each of the cores is magnetically conductive, situated in a common plane, and symmetrically situated about a center of rotation. A plurality of electrically conductive coils are provided with each coil situated at least partially in a respective one of the cores.

5 Claims, 10 Drawing Sheets

MAGNETIC AXIAL THRUST BEARINGS FABRICATED ON INDIVIDUAL STATOR SEGMENTS

BACKGROUND OF THE INVENTION

Magnetic bearings for large generators, such as hydrogenerators having stator bearing diameters on the order to thirty to fifty feet, are difficult to transport and not easily adapted for field assembly.

In conventional methods of fabricating axial thrust bearings, a large solid circular plate having a shaft is grooved to provide circular slots in which circular coils are inserted to form the stator windings. The suspended element (the rotor) has a similar solid plate, but does not have grooves or windings. These configurations have the advantages that they are simple to fabricate and do not require end windings. Furthermore, these configurations result in low iron losses in the suspended elements because the flux linkages in the suspended elements remain substantially constant as long as the DC excitation remains constant and the flux varies only in the radial direction. Multiple sets of concentric, independently driven coils can be used to provide fault tolerance.

A limitation of the conventional techniques is that control bandwidth is restricted by solid iron flux paths in the bearing stator cores. Radial lamination of stators increases control bandwidth, but it is impractical and expensive to efficiently laminate adjacent sheets in a ring. Tape wound cores for the stator and rotor can be used to help control bandwidth but still have high losses because the flux must be forced through the airgaps between tape layers. A further limitation is that eddy currents are induced in the tape windings by flux entering perpendicular to the plane of each tape. Special processes are needed to provide sufficient mechanical strength in mounting of tape wound cores to withstand the axial forces. The diameter of grooved solid or tape wound cores is kept small enough to avoid the necessity of performing the winding process in the field.

Magnetic force structures cannot exceed about 150 psi (pounds per square inch) average normal pressure and generally run at about 115 psi average pressure to allow for flexibility in responding to situations requiring more force. In contrast, fluid film bearings can run at 400 to 600 psi. Typically, conventional magnetic force bearing structures are used in conjunction with fluid film bearing structures so each bearing structure need only support one half of the load. Furthermore, conventional structures generally are small, high speed machines with power in the 100 kVA (kilovolt ampere) range. Hence bearings have not required large diameters.

In order to provide magnetic bearings for large, slow speed machines without relying on fluid film bearings, significantly larger bearing areas must be provided to carry the same loads. In situations wherein the load is especially high or fault tolerance is critical, there is often not enough room on the average stator side to sufficiently expand the bearing area in the region usually assigned to the bearing.

SUMMARY OF THE INVENTION

Accordingly, it would be desirable to provide a thrust bearing coil configuration that is capable of field assembly and that can be made fault tolerant with low losses and improved bandwidth.

Briefly, in accordance with an embodiment of the invention, an axial magnetic thrust bearing stator comprises a plurality of laminated cores. Each of the cores is magnetically conductive, situated in a common plane, and symmetrically situated about a center of rotation. A plurality of electrically conductive coils are provided with each coil situated at least partially in a respective one of the cores.

The cores can be situated such that each respective core is adjacent to two other cores, or a core can be spaced apart from other cores. If desired, nonmagnetic wedges or flux barriers can be situated between respective pairs of cores to reduce magnetic coupling. The cores can have any appropriate shape. For example, in one embodiment each core has a respective surface situated on a common plane with a pair of slots for insertion of a respective coil. In another embodiment, each core comprises a middle portion between first and second larger portions, a respective coil is situated around the middle portion, the first larger portion has a surface facing toward the center of rotation, and the second larger portion has a surface facing away from the center of rotation. In another embodiment, each core has a surface with a raised portion, and a respective coil is wrapped around the raised portion.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
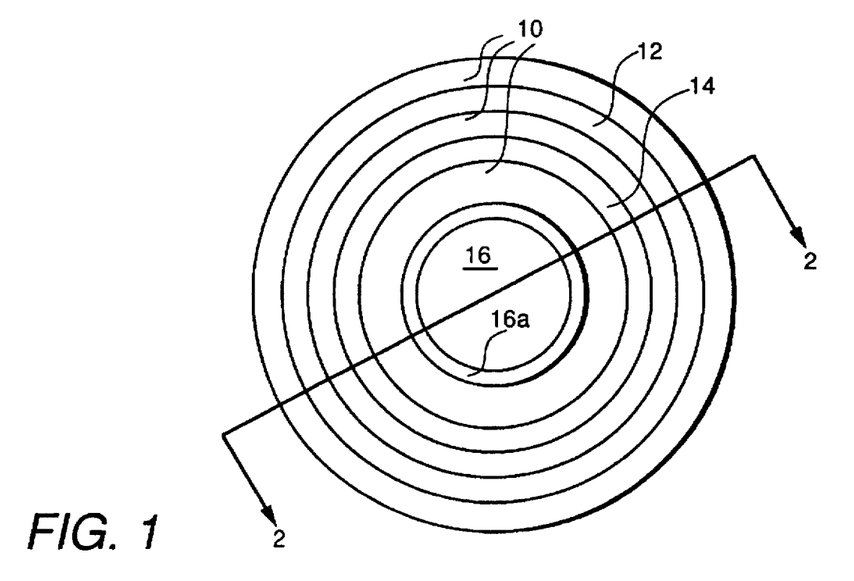
FIG. 1 is a front view of a conventional stator axial thrust magnetic bearing embodiment.
Figure 2:
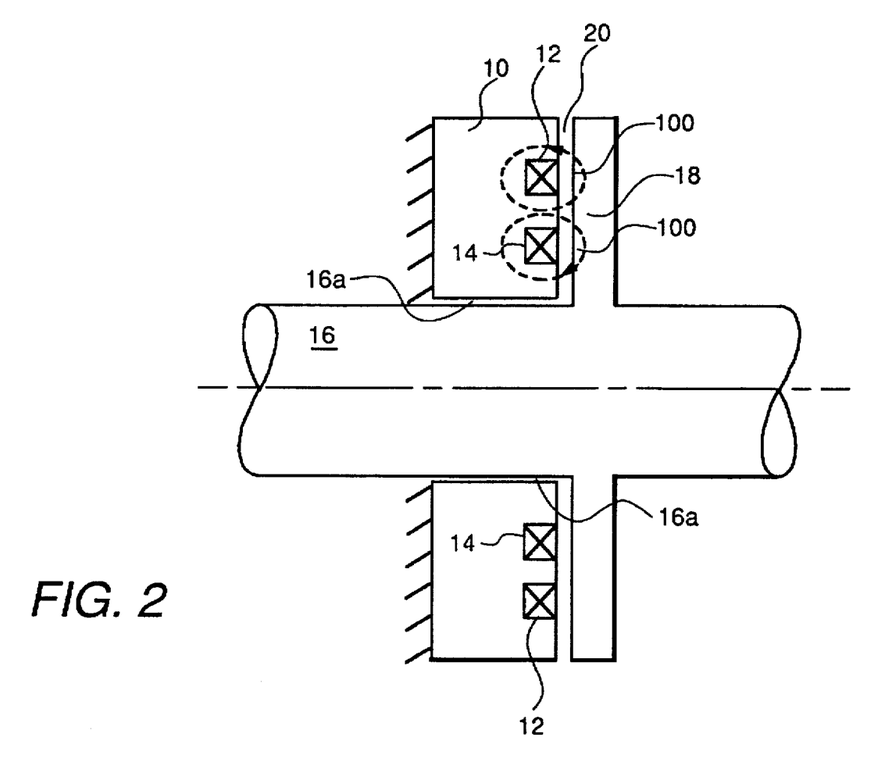
FIG. 2 is a sectional side view along line 2—2 FIG. 1.

FIGS. 1 and 2 are front and sectional side views, respectively, of a conventional stator axial thrust magnetic bearing embodiment. A large solid circular plate 10 is grooved with circular slots in which circular coils 12 and 14 are inserted to form the stator windings. A rotor shaft 16 can extend through an opening 16a in the circular plate. Typical flux paths 100 are shown in FIG. 2. The suspended element, shown as rotor 18, has a similar solid plate but no grooves or windings.

Figure 3:
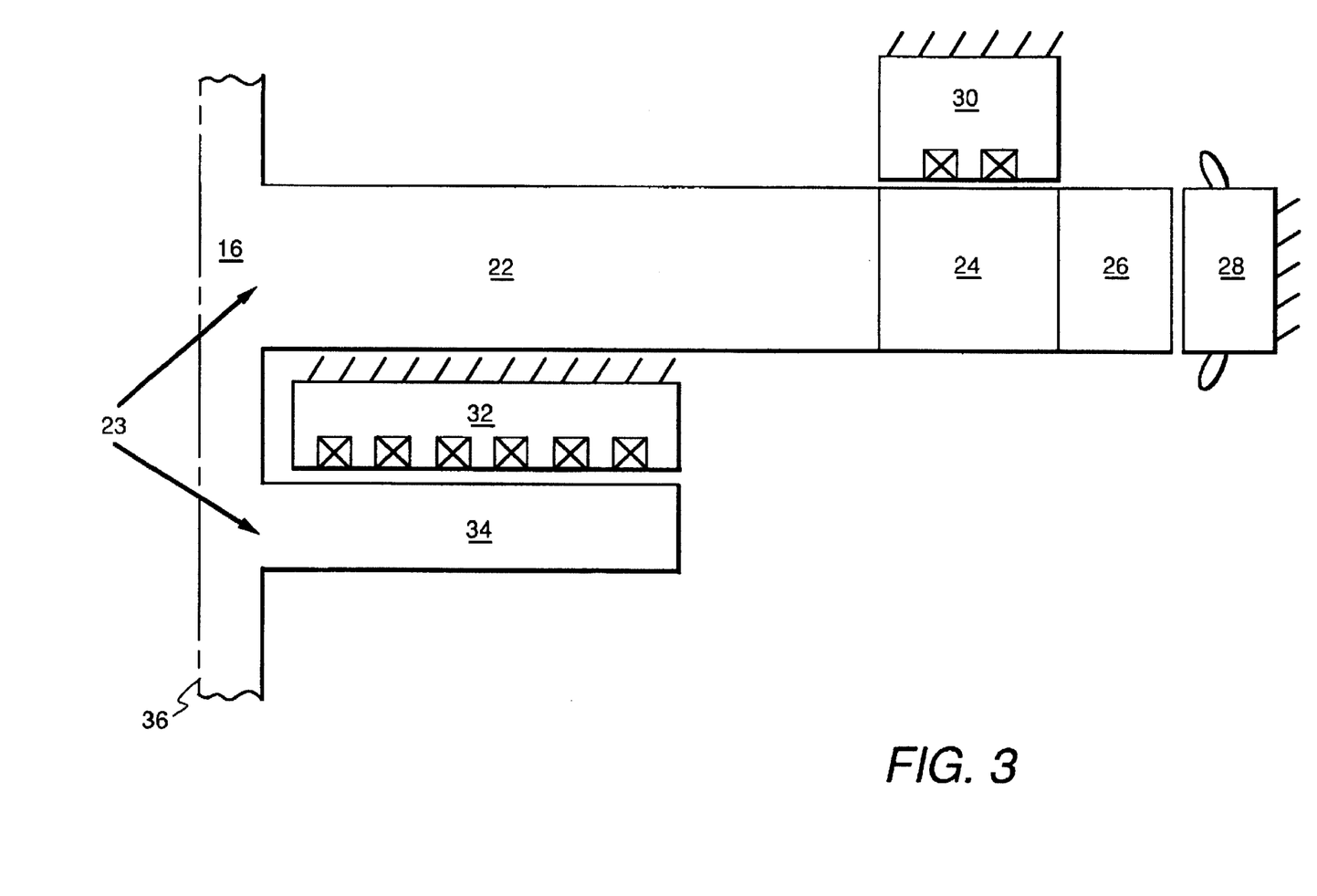
FIG. 3 is a partial schematic view of a portion of a hydrogenerator of the present invention.

FIG. 3 is a view of one side of a portion of a hydrogenerator of the present invention about a center line 36 of shaft 16. In the present invention, no fluid film bearing is required. Multiple electromagnetic stator bearings can be used for situations wherein the load is especially high or fault tolerance is critical and therefore not enough room exists on the stator to sufficiently expand the bearing area in a single location. The rotor diameter can be so large that a single concentric winding stator magnetic structure can be impractical.

In FIG. 3, a rotor 23 includes rotating plate 34 and a generator 22 which includes a steel inertia ring 24, and a generator field pole 26. A stator 28 of the generator is situated near the generator field pole. One bearing stator 32 of the present invention remains stationary between the generator and the stationary plate. A second bearing stator 30 is positioned above inertia ring 24.

Figure 4:
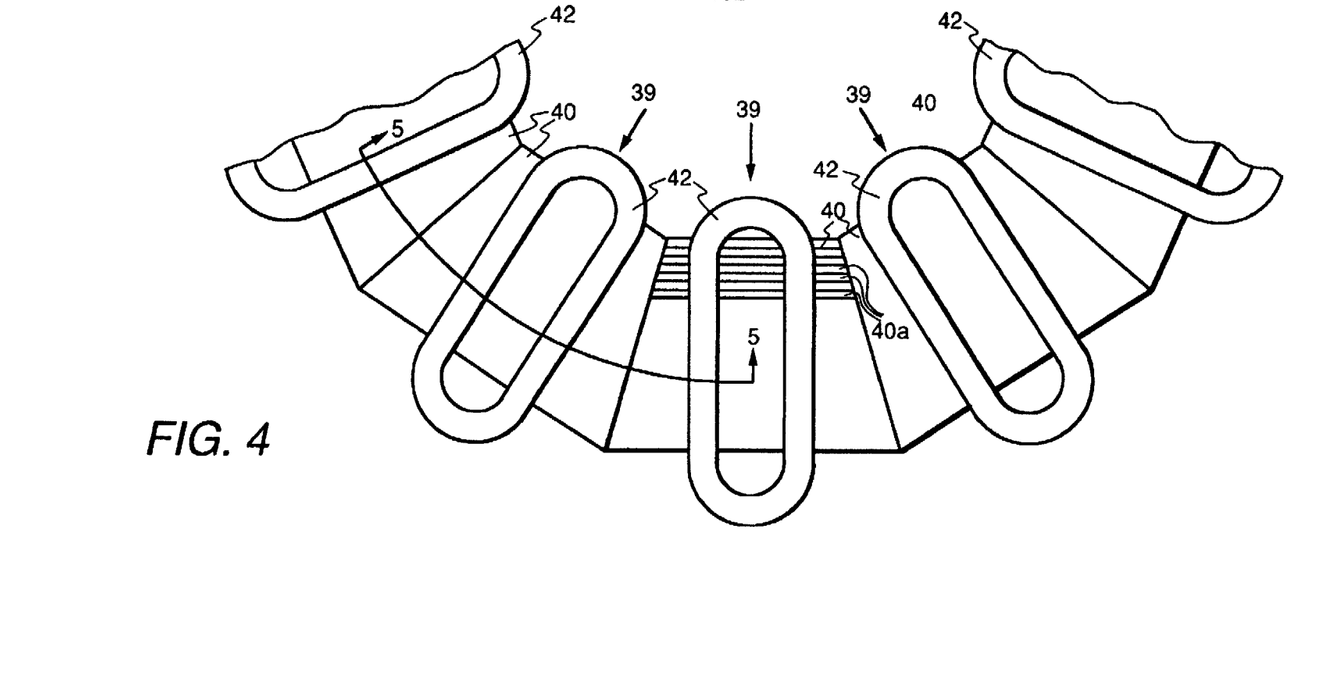
FIG. 4 is a partial front view of an embodiment of bearing stator segments of the present invention.
Figure 5:
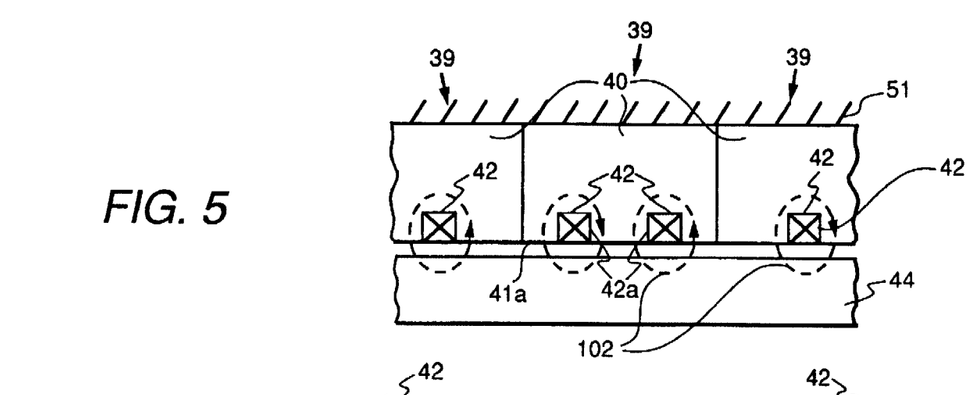
FIG. 5 is a sectional view along line 5—5 of FIG. 4.

FIG. 4 is a partial front view of an embodiment of bearing stator segments 39 of the present invention which are useful configurations for bearing 30 and/or bearing 32 in FIG. 3, and FIG. 5 is a sectional view along line 5—5 of FIG. 4 showing example flux paths 102 which are expected to occur during bearing operation. Individual factory fabricated bearing stator segments 39 are used to form the magnetic thrust bearing.

Each stator segment 39 can be fabricated with a stack of E-shaped cores 40 comprising iron or steel laminations with a respective coil 42 embedded in a respective core slot. The laminations, illustrated by several individual laminations 40a in FIG. 4, are preferably oriented perpendicular with respect to the suspended piece 44. For some high bandwidth applications it may be desirable to fabricate the rotor using stacks similar to those of the stator but without windings or slots.

In FIG. 4, the stator cores are adjacent and angled. There are several methods for achieving angled cores. For example, laminations of differing widths can be used. In another example, a rectangular core can either have selected edges machined away or powdered iron composite laminations added.

Coil 42 may comprise an insulated copper or aluminum winding. In one embodiment, each coil is pre-wound, wedged into a pair of slots 42a extending toward a center of rotation (shown as center of rotation 180 in FIG. 15) of a surface 41a of a core (shown in FIG. 5), impregnated with a resin or varnish, and tested in the factory.

Each bearing stator segment can be fabricated and tested in a controlled factory environment (which results in a more reliable unit than insertion of windings in the field). Mass-produced stator segments can be assembled on site and connected together. In one, embodiment, the stator segments are connected together on a common plane by bolting the cores to a stationary reference frame 51.

Flux variations occur in the area of coils 42. If a suspended element 44 comprises solid iron, the embodiment of FIGS. 4–5 results in a configuration which will have an alternation of flux density in the azimuthal direction. The alternation of flux density can create losses in the suspended element 44 arising from hysteresis and eddy currents in the solid iron. If laminated materials are used for the suspended element, the laminations provide a reduction of eddy current losses. Even if the solid iron suspended element is used, however, the losses will be lower than corresponding losses in fluid film bearings. Another advantage of this configuration is that each bearing stator segment 39 is magnetically independent, and therefore redundant controls (for fault tolerance or for control of vibrational modes) can be implemented. A flexible design can be used because each segment can be operated either separately or as a unit. Having redundancy by linking two or more segments can be used to compensate for structure vibrations. This type of compensation is not available for fluid film bearings or for the slot type bearings discussed in the background section.

Figure 6:
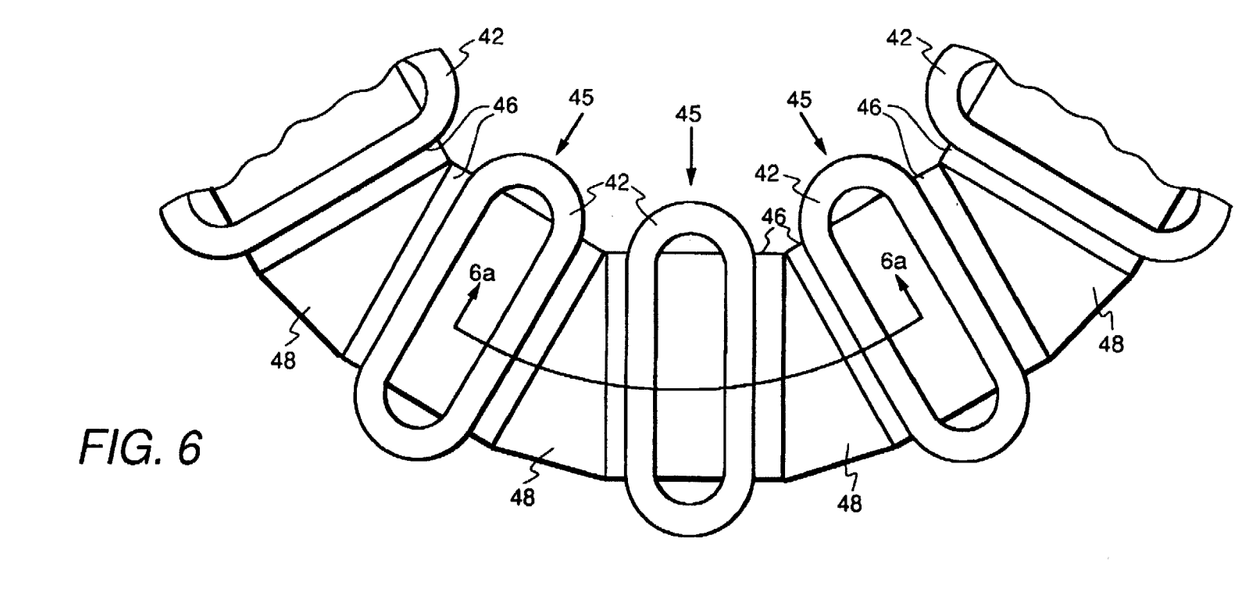
FIG. 6 is a partial front view of another embodiment of bearing stator segments of the present invention.
Figure 6A:
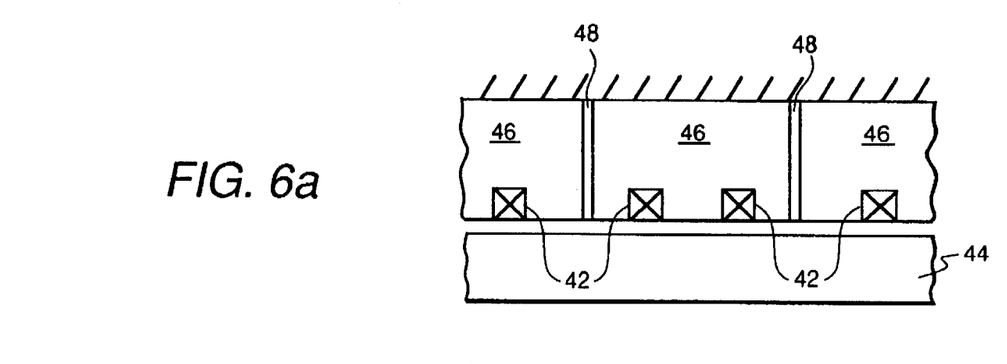
FIG. 6a is a sectional view along line 6a—6a of FIG. 6.

FIG. 6 is a partial front view of another embodiment of bearing stator segments 45 of the present invention, and FIG. 6a is a sectional view along line 6a—6a of FIG. 6. In FIG. 6, segment cores 46 are blocks (laminated stacks) made rectangular so that all the laminations can have the same rectangular dimensions. This embodiment has advantages of simplicity in segment fabrication because the segments need not be graded or cut to fit into the stator.

Segment cores 46 can be bolted into position as discussed with respect to FIG. 4. Wedges 48 comprising a molded powdered iron composite or material similar to the segment cores can be fixed between the segment cores to reduce losses, if desired.

Figure 7:
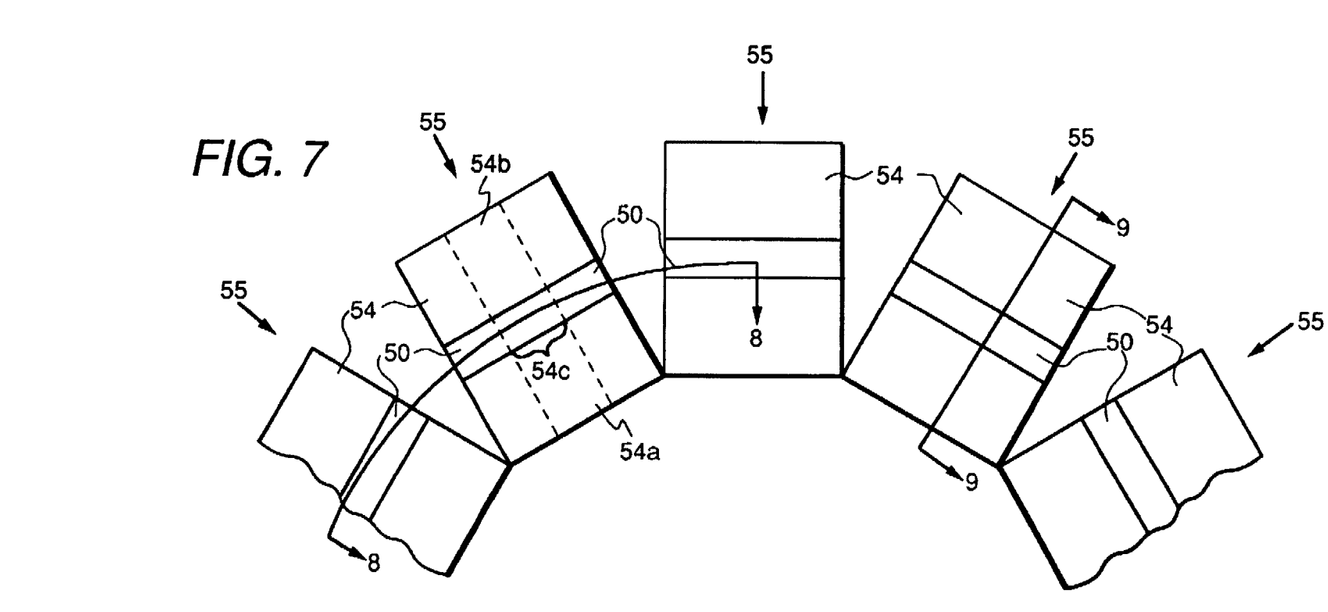
FIG. 7 is a front view of another embodiment of bearing stator segments of the present invention.
Figure 8:
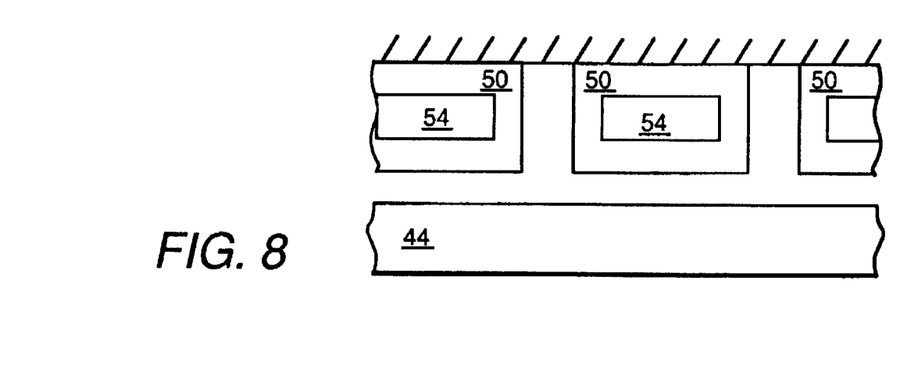
FIG. 8 is a sectional view along line 8—8 of FIG. 7.
Figure 9:
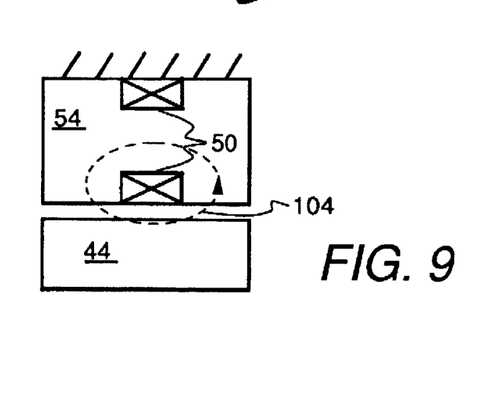
FIG. 9 is a sectional view along line 9—9 of FIG. 7.

FIG. 7 is a sectional front view of another embodiment of bearing stator segments 55 of the present invention, FIG. 8 is a sectional view along line 8—8, and FIG. 9 is a sectional view along line 9—9 illustrating an expected flux path 104. In this embodiment, H-shaped stator cores 54 are used. Each core comprises a middle portion 54c between first and second larger portions 54a and 54b.

Figure 7A:
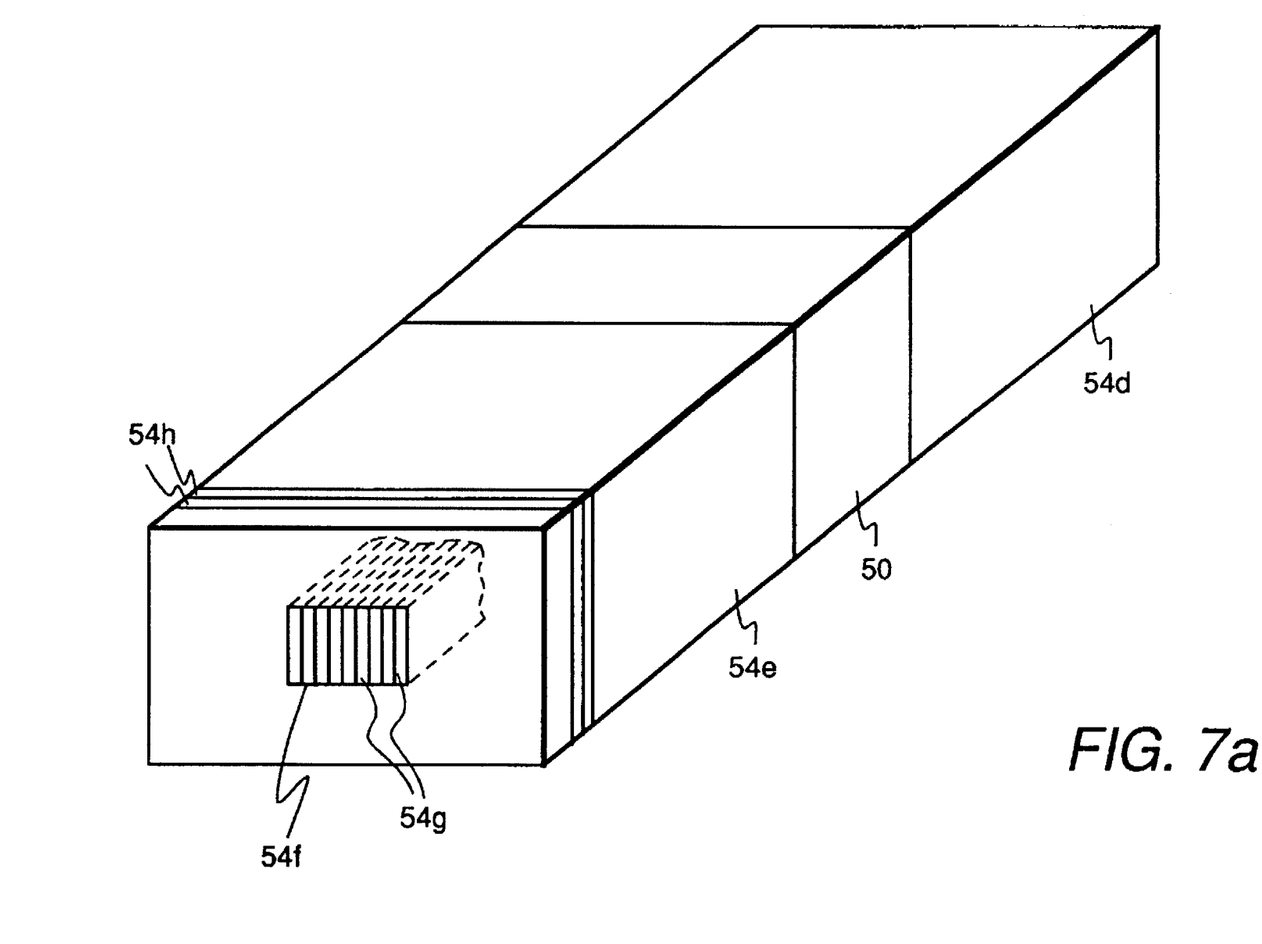
FIG. 7a is a perspective view of one embodiment of a bearing stator segment of the type shown in FIG. 7.

FIG. 7a is a perspective view of one embodiment of a bearing stator segment of the type shown in FIG. 7. As shown, one method of fabricating core 54 is to provide a long thin middle portion 54f extending the length of the core with the first and second larger portions, shown in FIG. 7a as 54d and 54e having openings through which the middle portion extends to efficiently form the H-shaped stator core. In this embodiment, it is preferred that the middle portion laminations, as shown by representative laminations 54g, be oriented perpendicular to the larger portion laminations, as shown by representative laminations 54h.

The coils 50 close around middle portions 54c over the back of the cores leaving the maximum airgap area to be dedicated to magnetic force production. The first larger portion 54a has a surface facing toward a center of rotation (such as shown by center of rotation 80 in FIG. 14), and the second larger portion 54b has a surface facing away from the center of rotation. In this embodiment there is no azimuthal variation of flux, and hence there will be no losses in a solid iron rotor. However, two shapes of laminations are used to fabricate the cores and additional copper will be required for the coils and associated additional copper losses will occur.

Figure 10:
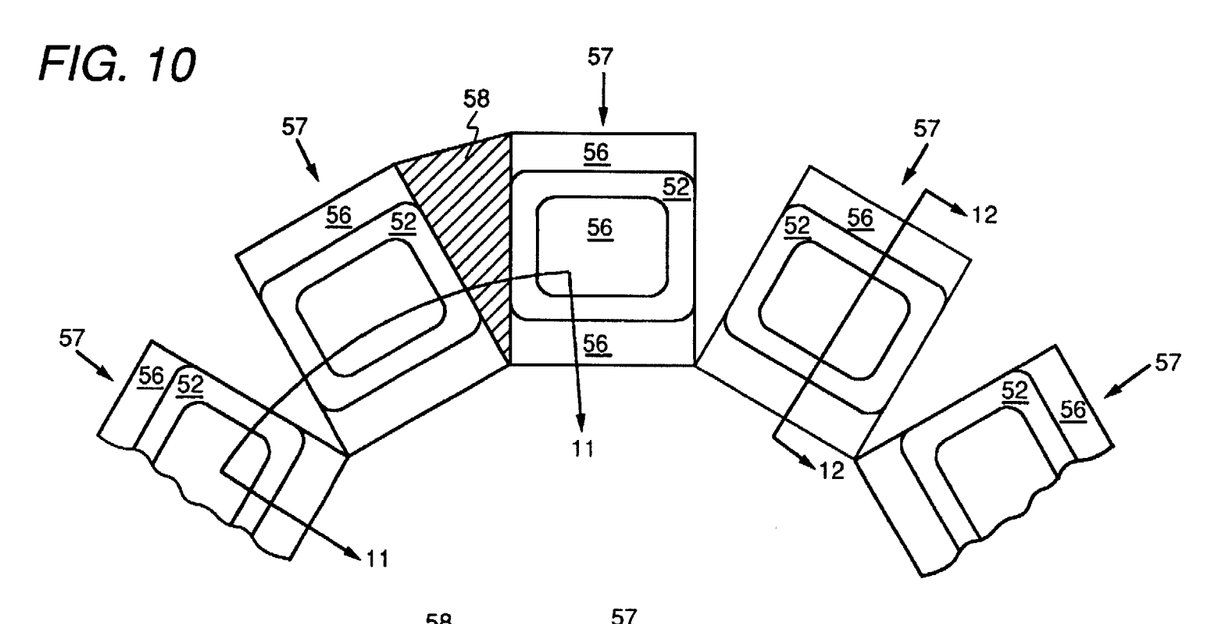
FIG. 10 is a partial front view of another embodiment of bearing stator segments of the present invention.
Figures 11, 12:
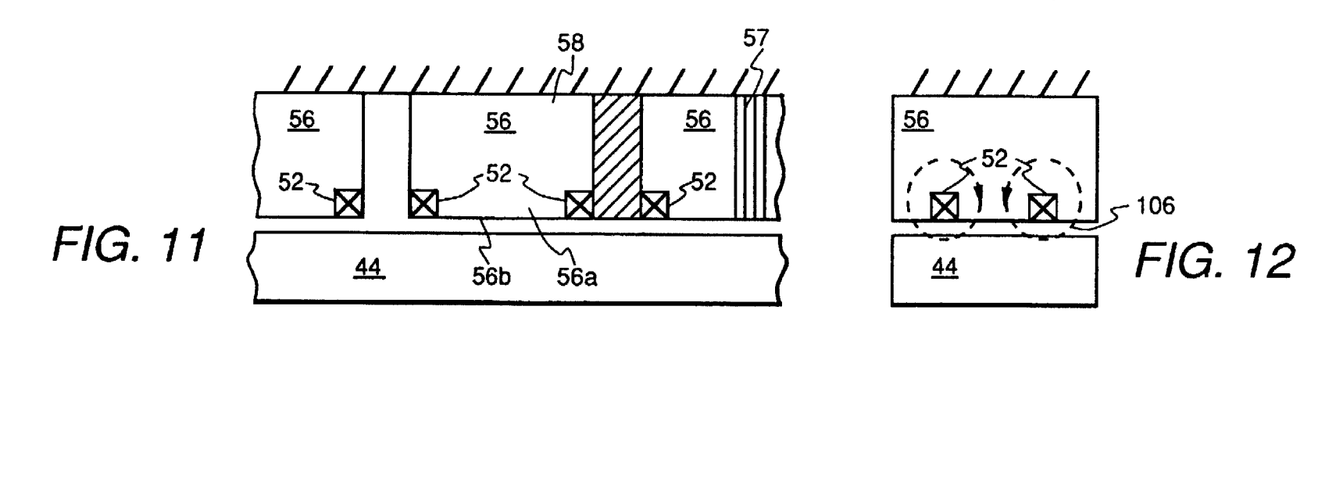
FIG. 11 is a sectional view along line 11—11 of FIG. 10.
FIG. 12 is a sectional view along line 12—12 of FIG. 10.

FIG. 10 is a partial front view of another embodiment of bearing stator segments 57 of the present invention, FIG. 11 is a sectional view along line 11—11, and FIG. 12 is a sectional view along line 12—12 illustrating expected flux paths 106. As shown in FIG. 11, each core 56 has a surface 56b with a raised portion 56a, and coils 52 are wrapped around respective raised portions, so two shapes of laminations will generally be used to fabricate the cores. The laminations, illustrated by several individual laminations 57 in FIG. 11, like the lamination in FIG. 4, are preferably oriented perpendicular with respect to the suspended piece 44. To create raised portion 56a, some of the laminations will include a raised portion whereas the laminations facing towards and away from a center of rotation do not require the raised portion.

In this embodiment, coils 52 are closed in the planes of the stator cores 56. This embodiment results in shorter coils than the embodiment of FIGS. 7–9 and correspondingly lower copper losses. To maximize the airgap forces, larger yokes are needed to feed flux to the extended "tooth" sections in both the embodiment of FIGS. 7–9 and the embodiment of FIGS. 10–12. Flux variations in the azimuthal direction are much reduced unless flux barriers, such as shown by flux barrier 58 in FIG. 10, for example, are introduced to enable magnetically decoupled redundant sections. A flux barrier may comprise a structurally compatible non-magnetic material such as aluminum or plastic, for example.

Figure 13:
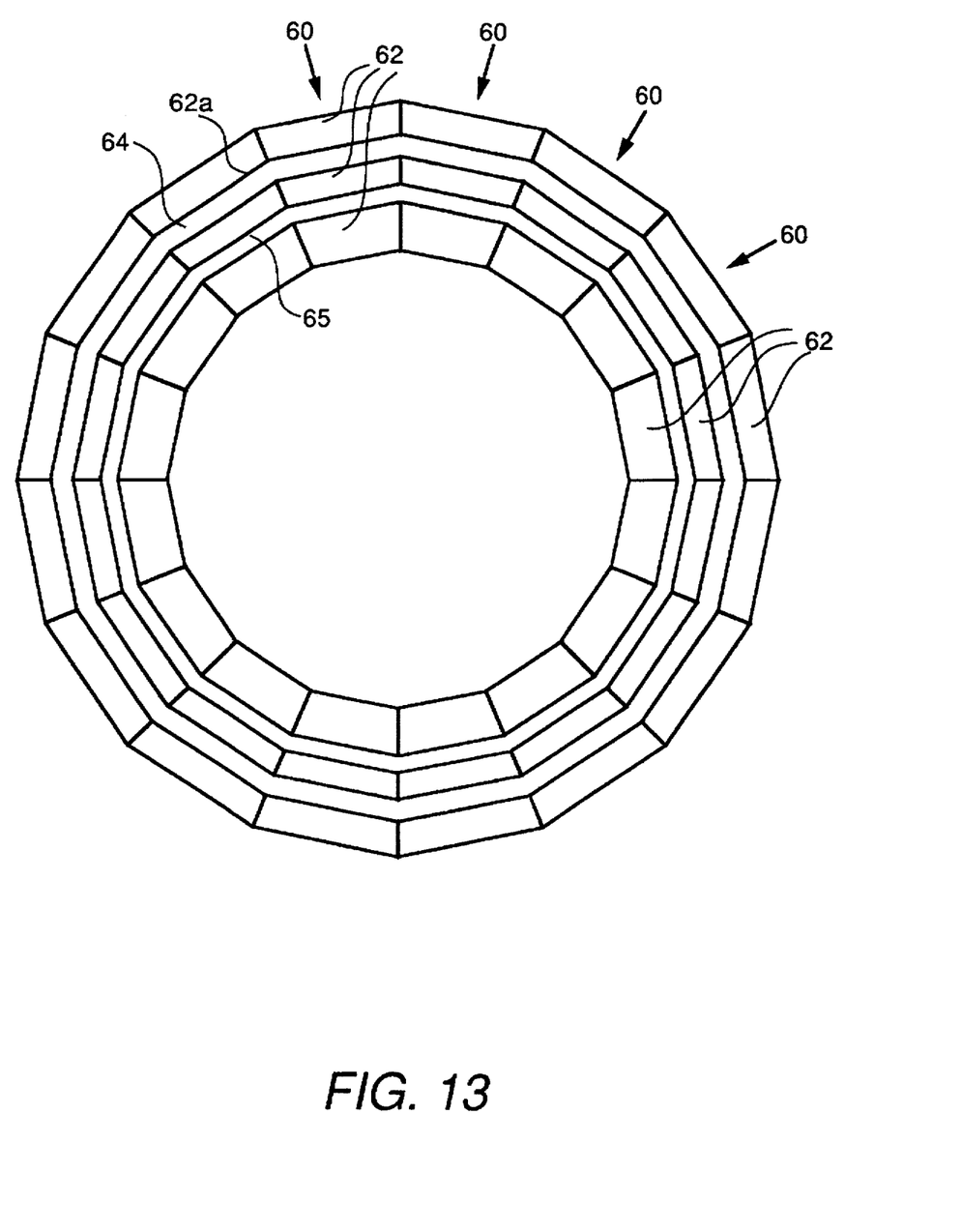
FIG. 13 is a front view of another embodiment of bearing stator segments of the present invention.

FIG. 13 is a front view of another embodiment of bearing stator segments 60 of the present invention. This embodiment combines the novel concept of segmented, laminated cores 62 with conventional ring windings, such as coils 64 and 65. In FIG. 13, each core has a surface with at least one respective slot 62a which forms an arc. A coil can then be situated at least partially in each of the slots.

Figure 14:
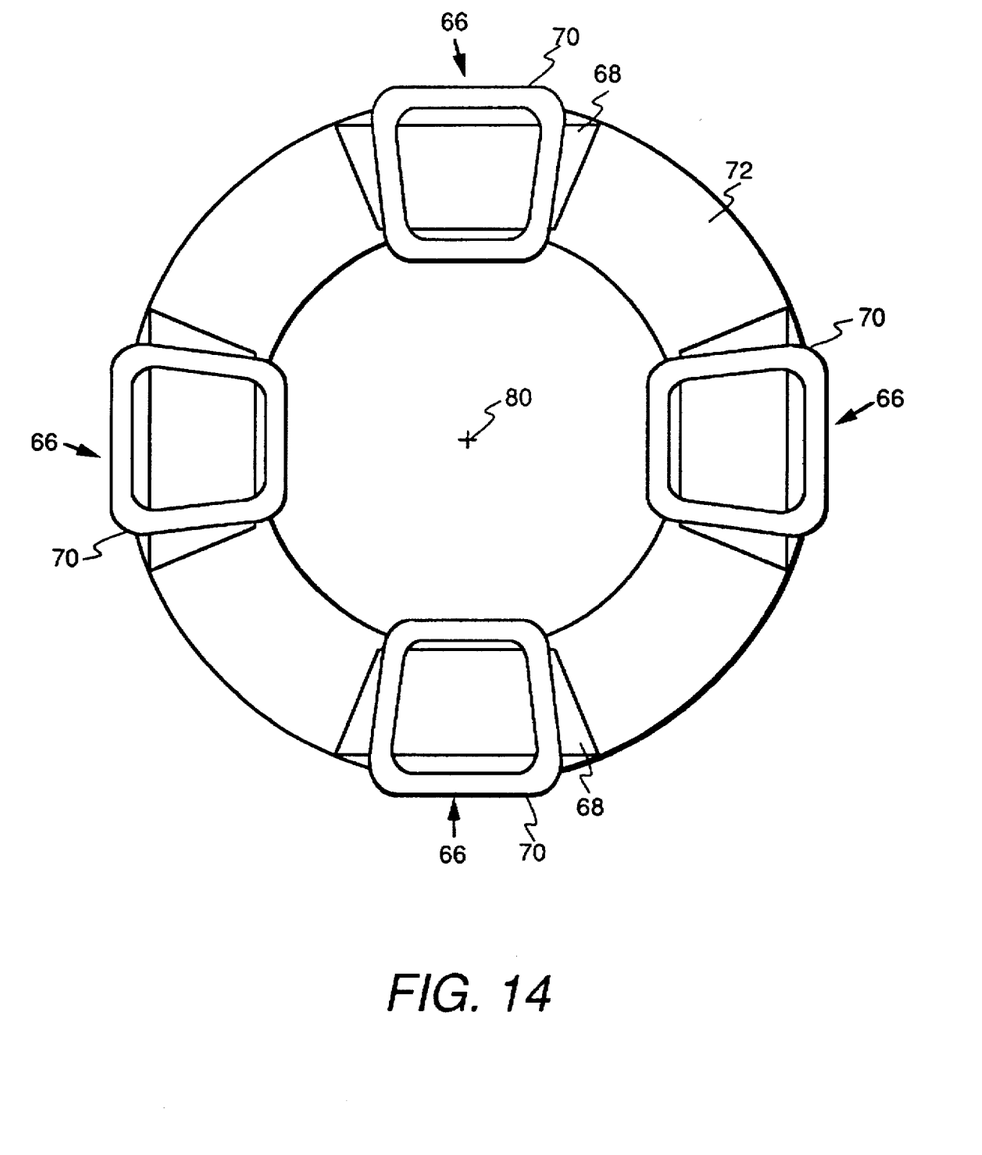
FIG. 14 is a front view of another embodiment of bearing stator segments of the present invention.

FIG. 14 is a front view of another embodiment of bearing stator segments 66 of the present invention. This embodiment shows a support surface 72 with spaced apart cores 68 with coils 70 instead of the more closely positioned cores shown in FIGS. 4–12. FIG. 14 is also useful for illustrating that each of the stator segments is situated on a common plane and symmetrically situated about a center of rotation indicated by reference number 80.

Figure 15:
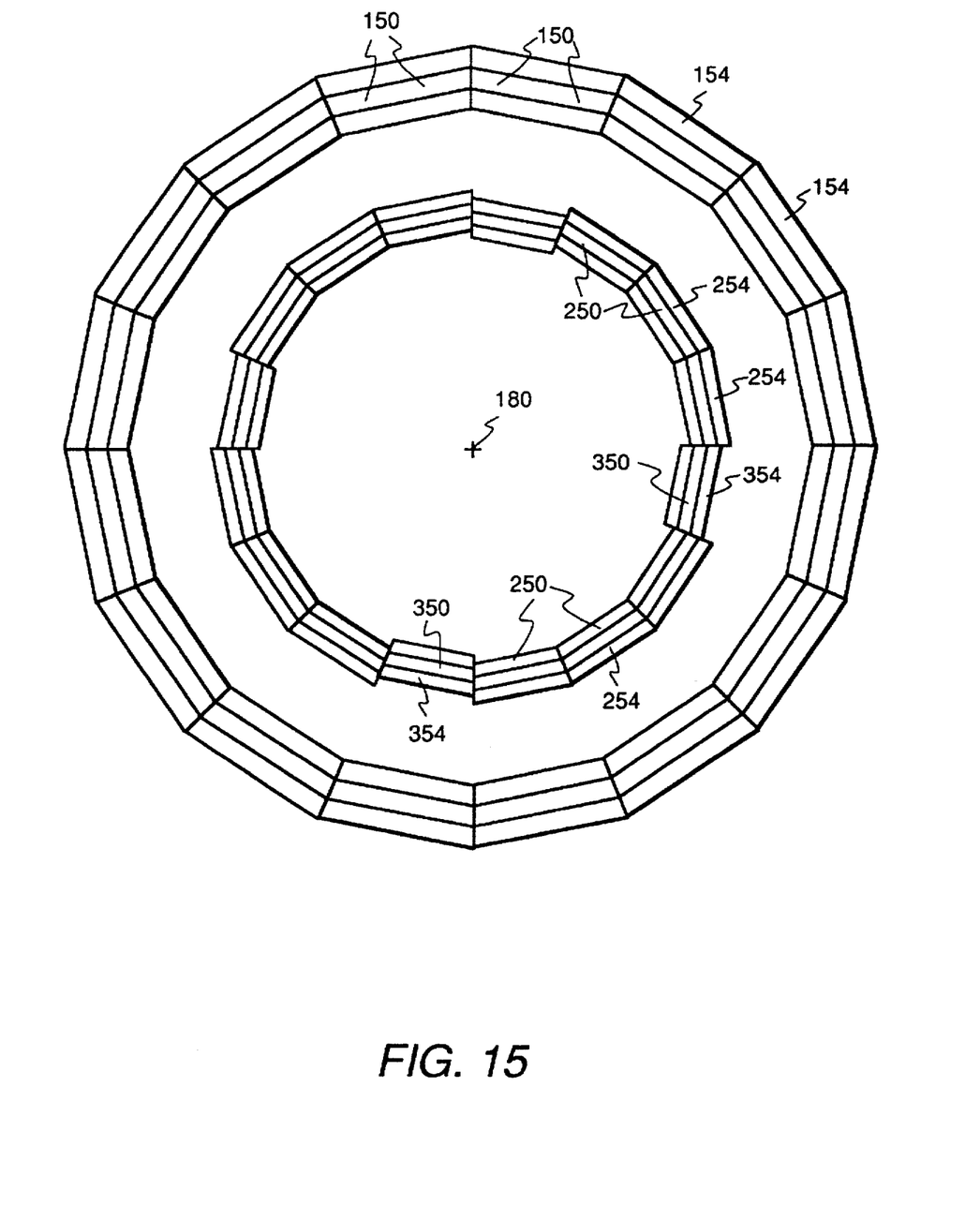
FIG. 15 is a front view of another embodiment of bearing stator segments of the present invention.

FIG. 15 is a front view of another embodiment of bearing stator segments of the present invention. FIG. 15 shows that the cores 254 and 354 (with respective coils 250 and 350) need not each be equidistant from the center of rotation 180. What is important is that the cores be symmetrically situated. With the addition of an outer ring of stator bearing segment cores 154 and coils 150, FIG. 15 further shows that two rings of cores can be used. Multiple rings can be useful for increasing bearing thrust. The cores are of the type described with respect to FIGS. 7–9 for example only; any appropriate core/coil configuration can be used.

The design most advantageous for a specific application will depend on available space, cost constraints, and the importance of efficiency and heat transfer.

If desired, a fluid film bearing can be positioned near another portion of the rotor for use in the event that a failure occurs. Preferably any such fluid film bearing would only be needed for emergency purposes. Therefore, the gap between the bearing and the rotor can be on the order of 100 mils in contrast to conventional fluid film bearing gaps of 2–3 mils. Hence the fluid film will normally have negligible losses except when total failure of the magnetic bearing occurs.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An axial magnetic thrust bearing stator comprising:
   a plurality of laminated bearing stator cores, each of the bearing stator cores comprising a block and being magnetically conductive, situated in a common plane, and symmetrically situated about a center of rotation;
   a plurality of bearing stator coils, each bearing stator coil being electrically conductive and situated at least partially in a respective one of the plurality of bearing stator cores; and
   a plurality of magnetic wedges, each magnetic wedge being situated between a respective pair of bearing stator cores.

2. An axial magnetic thrust bearing stator comprising:
   a plurality of laminated cores, each of the cores being magnetically conductive, situated in a common plane, and symmetrically situated about a center of rotation; and
   a plurality of coils, each coil being electrically conductive and situated at least partially in a respective one of the plurality of cores,
   each core including a respective surface with a pair of slots extending toward the center of rotation, a respective coil being situated at least partially in the slots, each respective surface being situated on a common plane.

3. An axial magnetic thrust bearing stator comprising:
   a plurality of laminated cores, each of the cores being magnetically conductive, situated in a common plane, and symmetrically situated about a center of rotation; and
   a plurality of coils, each coil being electrically conductive and situated at least partially in a respective one of the plurality of cores,
   each core comprising a middle portion between first and second larger portions, a respective coil being situated around the middle portion, the first larger portion having a surface facing toward the center of rotation, the second larger portion having a surface facing away from the center of rotation.

4. The stator of claim 3, further including a flux barrier between at least one pair of adjacent cores.

5. An axial magnetic thrust bearing stator comprising:
   a plurality of laminated bearing stator cores, each of the bearing stator cores being magnetically conductive, situated in a common plane, and symmetrically situated about a center of rotation;
   a plurality of bearing stator coils, each bearing stator coil being electrically conductive and situated at least partially in a respective one of the plurality of bearing stator cores,
   each bearing stator core including a surface with a raised portion, a respective bearing stator coil being wrapped around the raised portion, each respective surface being situated on a common plane; and
   a flux barrier between at least one pair of bearing stator cores.

* * * * *